United States Patent
Hong et al.

(10) Patent No.: US 8,995,274 B2
(45) Date of Patent: Mar. 31, 2015

(54) METHODS AND SYSTEMS FOR CONTROLLING TRAFFIC ON A COMMUNICATION NETWORK

(75) Inventors: Se Gi Hong, New York, NY (US); Henning Schulzrinne, Leonia, NJ (US)

(73) Assignee: The Trustees of Columbia University in the City of New York, New York, NY (US)

(*) Notice: Subject to any disclaimer, the term of this patent is extended or adjusted under 35 U.S.C. 154(b) by 164 days.

(21) Appl. No.: 13/002,417

(22) PCT Filed: Jul. 2, 2009

(86) PCT No.: PCT/US2009/049608
§ 371 (c)(1),
(2), (4) Date: Jan. 3, 2011

(87) PCT Pub. No.: WO2010/003113
PCT Pub. Date: Jan. 7, 2010

(65) Prior Publication Data
US 2011/0107098 A1    May 5, 2011

Related U.S. Application Data (60) Provisional application No. 61/078,291, filed on Jul. 3, 2008, provisional application No. 61/079,411, filed on Jul. 9, 2008, provisional application No. 61/110,344, filed on Oct. 31, 2008, provisional application No. 61/156,371, filed on Feb. 27, 2009.

(51) Int. Cl.
*H04L 9/32* (2006.01)
*H04L 12/701* (2013.01)
(Continued)

(52) U.S. Cl.
CPC ............ *H04L 45/00* (2013.01); *H04L 63/1441* (2013.01); *H04L 45/22* (2013.01); *H04L 45/304* (2013.01); *H04L 63/1416* (2013.01); *H04L 63/1458* (2013.01); *H04L 2463/143* (2013.01)
USPC .............. 370/236; 370/235; 370/229; 726/23

(58) Field of Classification Search
CPC ... H04L 2463/143; H04L 45/00; H04L 45/22; H04L 45/304; H04L 63/1416; H04L 63/1441; H04L 63/1458
USPC ................. 726/23, 26, 22; 370/235, 229, 236
See application file for complete search history.

(56) References Cited

U.S. PATENT DOCUMENTS 5,455,865 A    10/1995   Perlman
(Continued)

FOREIGN PATENT DOCUMENTS

| CN | 101110664 | 1/2008 |
| CN | 101123584 | 2/2008 |

OTHER PUBLICATIONS

Kent et al., Security Architecture for the Internet Protocol, RFC4301 (IETF 2005).*
(Continued)

*Primary Examiner* — Jung Kim
*Assistant Examiner* — Theodore Parsons
(74) *Attorney, Agent, or Firm* — Baker Botts L.L.P.

(57) ABSTRACT

Mechanisms for controlling traffic on a communication network are described. The mechanisms can be implemented, for example, using signaling messages. For example, a receiver can send a permission message to allow the sender to send a given amount of data along a particular path. As another example, a sender can send a query message indicating a volume of data that has been sent since the sender received a permission message. Upon receiving the query message, a receiver (or another device such as a router, etc.) can detect an attack by comparing the volume of data in the query message with the volume of data that has been received by the receiver. Upon detecting an attack, the receiver can drop unauthorized packets or request the sender to use a security protocol (e.g., IPsec AH) when transmitting data packets and/or change the path of the data flow (e.g., using multi-homing).

30 Claims, 5 Drawing Sheets

(51) Int. Cl.
*H04L 29/06* (2006.01)
*H04L 12/707* (2013.01)
*H04L 12/725* (2013.01)
*G06F 21/00* (2013.01)

(56) References Cited

U.S. PATENT DOCUMENTS

| | | | |
|---|---|---|---|
| 6,032,258 A | | 2/2000 | Godoroja et al. |
| 6,092,191 A | | 7/2000 | Shimbo et al. |
| 6,111,877 A | | 8/2000 | Wilford et al. |
| 6,425,004 B1 | | 7/2002 | Hardjono |
| 6,725,378 B1 | | 4/2004 | Schuba et al. |
| 6,738,814 B1 | | 5/2004 | Cox et al. |
| 6,813,245 B1 | * | 11/2004 | Furuno .................. 370/236 |
| 7,124,440 B2 | | 10/2006 | Poletto et al. |
| 7,500,264 B1 | | 3/2009 | Leavy et al. |
| 2002/0004842 A1 | * | 1/2002 | Ghose et al. ............ 709/235 |
| 2002/0097724 A1 | | 7/2002 | Halme et al. |
| 2002/0145981 A1 | * | 10/2002 | Klinker et al. .......... 370/244 |
| 2002/0150043 A1 | | 10/2002 | Perlman et al. |
| 2003/0067903 A1 | * | 4/2003 | Jorgensen ............... 370/338 |
| 2003/0177381 A1 | | 9/2003 | Ofek et al. |
| 2003/0182431 A1 | * | 9/2003 | Sturniolo et al. ....... 709/227 |
| 2003/0212901 A1 | * | 11/2003 | Mishra et al. ........... 713/200 |
| 2004/0095932 A1 | * | 5/2004 | Astarabadi et al. ..... 370/389 |
| 2005/0038905 A1 | | 2/2005 | Banes et al. |
| 2005/0063303 A1 | * | 3/2005 | Samuels et al. ......... 370/229 |
| 2005/0108576 A1 | | 5/2005 | Munshi |
| 2005/0111367 A1 | * | 5/2005 | Jonathan Chao et al. ..... 370/235 |
| 2006/0041761 A1 | * | 2/2006 | Neumann et al. ....... 713/189 |
| 2006/0064458 A1 | | 3/2006 | Gehrmann |
| 2006/0173968 A1 | * | 8/2006 | Vaarala et al. .......... 709/214 |
| 2006/0274693 A1 | * | 12/2006 | Nikander et al. ....... 370/331 |
| 2007/0133602 A1 | * | 6/2007 | Russell .................... 370/467 |
| 2007/0277035 A1 | * | 11/2007 | Patel et al. .............. 713/168 |
| 2008/0159299 A1 | * | 7/2008 | Bu et al. ................. 370/400 |
| 2009/0196189 A1 | * | 8/2009 | Ostrup et al. ........... 370/252 |

OTHER PUBLICATIONS

Weis, RSA-SHA-1 Signatures in IPSec ESP and AH, RFC4359 (IETF Jan. 2006).*
Moskowitz, Host Identity Protocol, draft-ietf-hip-base-08 (IETF Jun. 11, 2007).*
Henderson, End-Host Mobility and Multihoming with the Host Identity Protocol, draft-ietf-hip-mm-05 (IETF Mar. 2, 2007).*
Nordmark et al., Shim6—Level 3 Multihoming Shim Protocol for IPv6, draft-ietf-shim6-proto-08 (IETF May 2007).*
Office Action dated Aug. 22, 2012 in U.S. Appl. No. 12/048,533.
American National Standard Institute. American national standard for financial services—Public key cryptography for the financial services industry: The Elliptic curve Digital Signature Algorithm (ECDSA), 2005.
Andersen, D. G., "Mayday: Distributed Filtering for Internet Services," 4th USENIX Symposium on Internet Technologies and System USITS, Mar. 2003.
Anderson, D. et al., "Best-Path vs. Multi-Path Overlay Routing", In Proceedings of the Internet Measurement Conference, Oct. 2003.
Anderson, D. et al., "Improving Web Availability for Clients with MONET", In Proceedings of the 2nd Symposium on Networked Systems Design and Implementation (NSDI), May 2005.
Anderson, T. et al., "Preventing Internet Denial-of-Service with Capabilities," Proceedings of the 2nd Workshop on Hot Topics Networks (HotNets-II), Nov. 2003.
Atkinson, R., "IP Authentication Header", Internet Engineering Task Force: RFC1826, Aug. 1995.
Bailey, M. et al., "The Internet Motion Sensor: A Distributed Blackhole Monitoring System", In Proceedings of the 12th ISOC Symposium on Network and Distributed Systems Security (SNDSS), pp. 167-179, Feb. 2005.
Black, J. et al., "UMAC: Fast and Secure Messsage Authentication", Lecture Notes in Computer Science, 1666:216-233, 1999.
Cooper, S. et al., "Internet X.509 Public Key Infrastructure Certificate and Certificate Revocation List (CRL) Profile", Internet Engineering Task Force: RFC5280, May 2008.
Diament, T. et al., "The Dual Receiver Cryptogram and Its Applications", In Proceedings of the 11th ACM Conference on Computer and Communications Security (CCS), Oct. 2004.
Dingledine R. et al., "Tor: The Second-Generation Onion Router," in Proceedings of the 13th USENIX Security Symposium, pp. 303-319, Aug. 2004.
Estrin, D. et al., "VISA Protocols for Controlling Inter-Organizational Datagram Flow", WRL Resarch Report 88/5, Dec. 1988.
Ferguson, P. and Senie, D., "Network Ingress Filtering: Defeating Denial of Service Attacks which employ IP Source Address Spoofing", Internet Engineering Task Force: RFC2827, May 2000.
Fu, X. et al., "Overhead and Performance Study of the General Internet Signaling Transport (GIST) Protocol", In Proceedings of IEEE Infocom, Barcelona, Spain, Apr. 2006.
Gligor, V. D., "Guaranteeing Access in Spite of Distributed Service-Flooding Attacks," Proceedings of the Security Protocols Workshop, Apr. 2003.
Guha S. and Francis, P., "An end-minddle-end approach to connection establishment", In Proceedings of the ACM SIGCOMM, Aug. 2007.
Gummadi, K. P. et al., "Improving the Reliability of Internet Paths with One-hop Source Routing", In Proceedings of the 6th Symposium on Operating Systems Design & Implementation, Dec. 2004.
Hancock, R. et al., "Next Steps in Signaling (NSIS): Framework", Internet Engineering Task Force: RFC4080, Jun. 2005.
International Patent Application No. PCT/US06/36327, filed Sep. 18, 2006.
International Preliminary Report on Patentability in International Patent Application No. PCT/US06/36327, filed Sep. 18, 2006, mailed Mar. 27, 2008.
International Preliminary Report on Patentability in International Patent Application No. PCT/US09/49608, filed Jul. 2, 2009, mailed Jan. 13, 2011.
International Search Report in International Patent Application No. PCT/US06/36327, filed Sep. 18, 2006, mailed Sep. 7, 2007.
Ioannidis, J. et al., "Implementing Push-Back: Router-Based Defense Against DDoS Attacks," Proceedings of the ISOC Symposium on Network and Distributed System Security (SNDSS), Feb. 2002.
Jakobsson, M. and Juels, A., "Proofs of Work and Bread Pudding Protocols", In Proceedings of the IFIP TC6 & TC11 Joint Working Conference on Communications and Multimedia Security, Sep. 1999.
Kandula, S. et al., "Botz-4-Sale: Surviging Organized DDoS Attacks That Mimic Flash Crowds", In Proceedings of the 2nd Symposium on Networked Systems Design and Implementation (NSDI), May 2005.
Kaufman, C., "Internet Key Exchange (IKEv2) Protocol", Internet Engineering Task Force: RFC4306, Dec. 2005.
Kent, S., "IP Authentication Header," RFC 4302, Dec. 2005.
Keromytis, A. D. et al., "SOS: An Architecture for Mitigating DDoS Attack," IEEE Journal on Selected Areas of Communications (JSAC), 2003, pp. 413-426, 33(3).
Keromytis, A. D. et al., "SOS: Secure Overlay Services," Proceedings of ACM SIG-COMM, Aug. 2002, pp. 61-72.
Krawczyk, H. et al., "HMAC: Keyed-Hashing for Message Authentication", Internet Engineering Task Force: RFC2104, Feb. 1997.
Manner, J. et al., "NSLP for Quality-of-Service Signaling", Internet draft, Internet Engineering Task Force, 2010. Work in progress.
Office Action dated Jan. 17, 2012 in U.S. Appl. No. 12/048,533.
Office Action dated Jun. 27, 2011 in U.S. Appl. No. 12/048,533.
Office Action dated Dec. 17, 2010 in U.S. Appl. No. 12/048,533.
Savage, S. et al., "Practical Network Support for IP Traceback," Proceedings of ACM SIGCOMM, Aug. 2000, pp. 295-306.
Schulzrinne, H. and Hancock, R., "GIST: General Internet Signaling Transport", Internet draft. Internet Engineering Task Force, Feb. 2008. Work in progress.
Steiner, M. et al., "Diffie-Hellman Key Distribution Extended to Group Communication", In Proceedigns of the ACM CCS. New Delhi, India, Mar. 1996.

(56) References Cited

OTHER PUBLICATIONS

Stiemerling, M. et al., "NAT/Firewall NSIS Signaling Layer Protocol (NSLP)", Internet draft, Internet Engineering Task Force, Oct. 2010. Work in progress.

U.S. Appl. No. 12/048,533, filed Mar. 14, 2008.

U.S. Appl. No. 60/717,716, filed Sep. 16, 2005.

Yaar, A. et al., "Pi: A Path Identification Mechanism to Defend Against DDoS Attacks," Proceedings of the IEEE Symposium on Security and Privacy, May 2003.

Yaar, A. et al., "SIFF: A Stateless Internet Flow Filter to Mitigate DDoS Flooding Attacks," Proceedings of the IEEE Symposium on Security and Privacy, May 2004.

Yang, X. et al., "A DoS-limiting Network Architecture", In Proceedings of the ACM SIGCOMM, Aug. 2005.

International Search Report in International Patent Application No. PCT/US09/49608, filed Jul. 2, 2009, mailed Sep. 1, 2009.

Written Opinion in International Patent Application No. PCT/US06/36327, filed Sep. 18, 2006, mailed Sep. 7, 2007.

Written Opinion in International Patent Application No. PCT/US09149608, filed Jul. 2, 2009, mailed Sep. 1, 2009.

Aura, T., "Cryptographically Generated Addresses (CGA)", Internet Engineering Task Force: RFC 2972, Mar. 2005, available at: http://www.ietf.org/rfc/rfc3972.txt.

Bradner, S., "Key Words for Use in RFCs to Indicate Requirement Levels", Technical Report, Internet Engineering Task Force: RFC 2119, Mar. 1997, available at: http://www.ietf.org/rfc/rfc2119.txt.

Fu, X., et al. "The Free Next Steps in Signaling (FreeNSIS) Implementation", University of Goettingen, available at: http://user.informatik.uni-goettingen.de/~nsis/.

Internet Engineering Task Force, "Next Steps in Signaling (NSIS) Working Group", available at: http://www.ietf.org/html.charters/nsis-charter.html/.

Kent, S., "Ip Encapsulating Security Payload (ESP)", Technical Report, Internet Engineering Task Force: RFC 4303, Dec. 2005, available at: http://www.ietf.org/rfc/rfc4303.txt.

Kohler, E., et al. "The Click Modular Router", In ACM Transactions on Computer Systems, vol. 18, No. 3, Aug. 2000, pp. 263-297.

Menezes, P. et al., "Handbook of Applied Cryptography", CRC Press, 1996, pp. 425-541.

Netfilter, "The Netfilter.org Project", available at: http://www.netfilter.org.

Office Action and Search Report dated May 21, 2013 in Chinese Patent Application No. 200980131655.X.

* cited by examiner

METHODS AND SYSTEMS FOR CONTROLLING TRAFFIC ON A COMMUNICATION NETWORK

CROSS REFERENCE TO RELATED APPLICATION

This application claims the benefit of U.S. Provisional Patent Applications Nos. 61/08291 filed Jul. 3, 2008, 61/079,411, filed Jul. 9, 2008, 61/110,344, filed Oct. 31, 2008, and 61/156,371, filed Feb. 27, 2009. each of which is hereby incorporated by reference herein in its entirety.

TECHNICAL FIELD

The disclosed subject matter relates to methods and systems for controlling traffic on a communication network.

BACKGROUND

Attacks on legitimate data flows on communication networks are an ongoing and evolving problem. Denial-of-service, spoofing, and drop attacks are common problems. In a denial-of-service attack, an overwhelming volume of bogus traffic packets and an overwhelming number of requests for a service can be sent to a server to cause the network resource to be overloaded. In a spoofing attack, an attacker pretends to be a legitimate sender and sends data that supplements or replaces a legitimate data flow and thus harms the receiver. In a drop attack, a device on a communication path between a legitimate sender and a legitimate receiver intentionally drop messages and data between the sender and receiver, causing a communication loss.

SUMMARY

Methods and systems for controlling traffic on a communication network are provided. In accordance with some embodiments, methods for controlling traffic on a communication network are provided, the methods comprising: receiving, at a processor in a receiver, a query message for permission to send a data flow to the receiver; sending a permission message from the receiver; detecting that at least one of a message and a data packet being sent to the receiver has been dropped; and causing the path for sending the data flow to be changed.

In accordance with some embodiments, methods for controlling traffic on a communication network are provided, the methods comprising: passing a query message for permission to send a data flow to a receiver; passing a permission message that authorizes the sender to send a given amount of traffic flow; and determining, using a processor, whether data packets are authorized based on the given amount of traffic flow.

In accordance with some embodiments, methods for controlling traffic on a communication network are provided, the methods comprising: passing a query message for permission to send a data flow to a receiver; passing a permission message that indicates a security protocol to be used when transmitting packets to the receiver; and detecting, using a processor, that a data packet being sent to the receiver violates the security protocol.

In accordance with some embodiments, methods for controlling traffic on a communication network are provided, the methods comprising: receiving, at a processor in a receiver, a query message for permission to send a data flow to the receiver; sending a permission message that indicates a security protocol to be used when transmitting packets to the receiver; and detecting that a data packet being sent to the receiver violates the security protocol.

In accordance with some embodiments, systems for controlling traffic on a communication network are provided, the systems comprising a receiver having a processor that: receives a query message for permission to send a data flow to the receiver; sends a permission message from the receiver; detects that at least one of a message and a data packet being sent to the receiver has been dropped; and causes the path for sending the data flow to be changed.

In accordance with some embodiments, systems for controlling traffic on a communication network are provided, the systems comprising a receiver having a processor that: passes a query message for permission to send a data flow to a receiver; passes a permission message that authorizes the sender to send a given amount of traffic flow; and determines whether data packets are authorized based on the given amount of traffic flow.

In accordance with some embodiments, systems for controlling traffic on a communication network are provided, the systems comprising: a processor that: passes a query message for permission to send a data flow to a receiver; passes a permission message that indicates a security protocol to be used when transmitting packets to the receiver; and detects that a data packet being sent to the receiver violates the security protocol.

In accordance with some embodiments, systems for controlling traffic on a communication network are provided, the systems comprising: a receiver having a processor that: receives a query message for permission to send a data flow to the receiver; sends a permission message that indicates a security protocol to be used when transmitting packets to the receiver; and detects that a data packet being sent to the receiver violates the security protocol.

DETAILED DESCRIPTION

In accordance with various embodiments, mechanisms for controlling traffic on a communication network are provided. These mechanisms can be used in a variety of applications, such as to prevent Denial-of-Service (DoS) attacks and other forms of unauthorized traffic.

In some embodiments, the control of traffic on a communication network can be implemented by requiring that permission be granted by a receiver before a sender can send data packets. Additionally, monitoring of data packets and signaling messages can be performed to verify that only authorized data packets are being communicated and that no authorized data packets are being dropped. Data packets that exceed their permission level (if any) can be dropped or rate-limited (e.g., to a very small volume) in some embodiments.

In order to control and monitor the transmission of authorized data packets, signaling messages can be sent between various devices on a communication network. For example, a receiver can alert routers (and/or any other suitable devices) between a sender and the receiver that data packets from the sender are authorized to be sent from the sender to the receiver. Permission to send data packets can be configured to automatically expire after a given period of time. However, in some embodiments, the permission can be refreshed periodically to maintain robustness under changing network conditions, such as routing changes, and to insure that permission is maintained for a period of time longer than an expiration duration.

To determine whether a flow of data packets violates the given permission for that flow, the volume of the data flow that has been received or sent since the permission state was set up can be determined. This determination can be made at any suitable one or more points along the path between a sender and a receiver. A router or other suitable device on the path can monitor the volume of data flow sent from the sender to the receiver. This data flow monitoring can detect the injection of bogus packets and dropping of legitimate packets. If it is detected that authorized packets are being dropped by a compromised router (or other device), the sender can be triggered to change the data flow path. To change the data flow path, a relay node that is far away from the current path can be used or path diversity by multi-homing can be used in some embodiments.

There are at least two message types that can be used to set up permission for a flow of data packets along a path: a query message and a permission message. The query message is sent by the sender to request permission from the receiver. The permission message is sent by the receiver upon granting permission to the sender. Additionally, the permission message can be used to remove (or revoke) and/or modify the permission state for a data flow.

In some embodiments, the General Internet Signaling Transport (GIST), described in Schulzrinne and Hancock, "GIST: General Internet Signaling Transport," Internet Draft "draft-ietf-nsis-ntlp-17," Internet Engineering Task Force, www.ietf.org, October 2008 (which is hereby incorporated by reference herein in its entirety), can be used to deliver signaling messages along the data path to configure the permission state of routers (or other devices) for a data flow. The GIST can be used to handle all incoming signaling messages and cause them to be passed to the appropriate mechanisms for processing as described herein. The delivery of signaling messages can be handled using a peer-to-peer approach. Thus, each node (or device) that is aware of the mechanism for controlling traffic described herein can forward a signaling message to the next node when it receives the signaling message.

In some embodiments, to protect the authentication and integrity of signaling messages, two security mechanisms can be used: message security in an end-to-end fashion and channel security in a hop-by-hop fashion. Message security can be used to protect the integrity of the messages on end-to-end traffic and channel security can be used to protect the integrity and confidentiality of the messages between adjacent nodes. The message security (which can be implemented using public key cryptography in some embodiments) is used to protect messages from being modified by attackers. The channel security (which can be implemented using transport layer security (TLS) and/or datagram transport layer security (DTLS) in some embodiments) can be used to distribute a shared key for Internet Protocol Security (IPsec) of data packets to the routers along the data path in a hop-by-hop fashion.

To authenticate data packets, a sender can use any suitable security protocol, such as IPsec Authentication Header (AH) (which is described in RFC4302 of the Internet Engineering Task Force (which is hereby incorporated by reference herein in its entirety)) for example. As another example, IPsec Encapsulating Security Payload (ESP) (which is described in RFC4303 of the Internet Engineering Task Force (which is hereby incorporated by reference herein in its entirety)) can be used for authentication in some embodiments. When using such a security protocol, routers can be configured to drop bogus packets, which may have been inserted by an unauthorized source, using an IP packet filter. When using IPsec AH, any suitable security mechanism can be used to protect the integrity of the authentication data field. For example, in a Byzantine network (e.g., one in which the sender and/or the routers are not trusted), a public key cryptography algorithm, such as RSA and Elliptic curve cryptography (ECC), can be used for the authentication data field in IPsec AH. As another example, in a trustworthy network (e.g., one in which routers are trusted and are not compromised), a symmetric key cryptography algorithm, such as Keyed-Hashing for Message Authentication (HMAC) (which is described in RFC2104 (which is hereby incorporated by reference herein in its entirety)), can be used for the authentication data field in IPsec AH because there are no on-path attackers in the trustworthy network. A receiver can choose a cryptography algorithm for the data message based on the policy, network, and applications used in some embodiments. The sequence number in the IPsec can also be used to detect bogus packets that are injected into the network.

Figure 1:
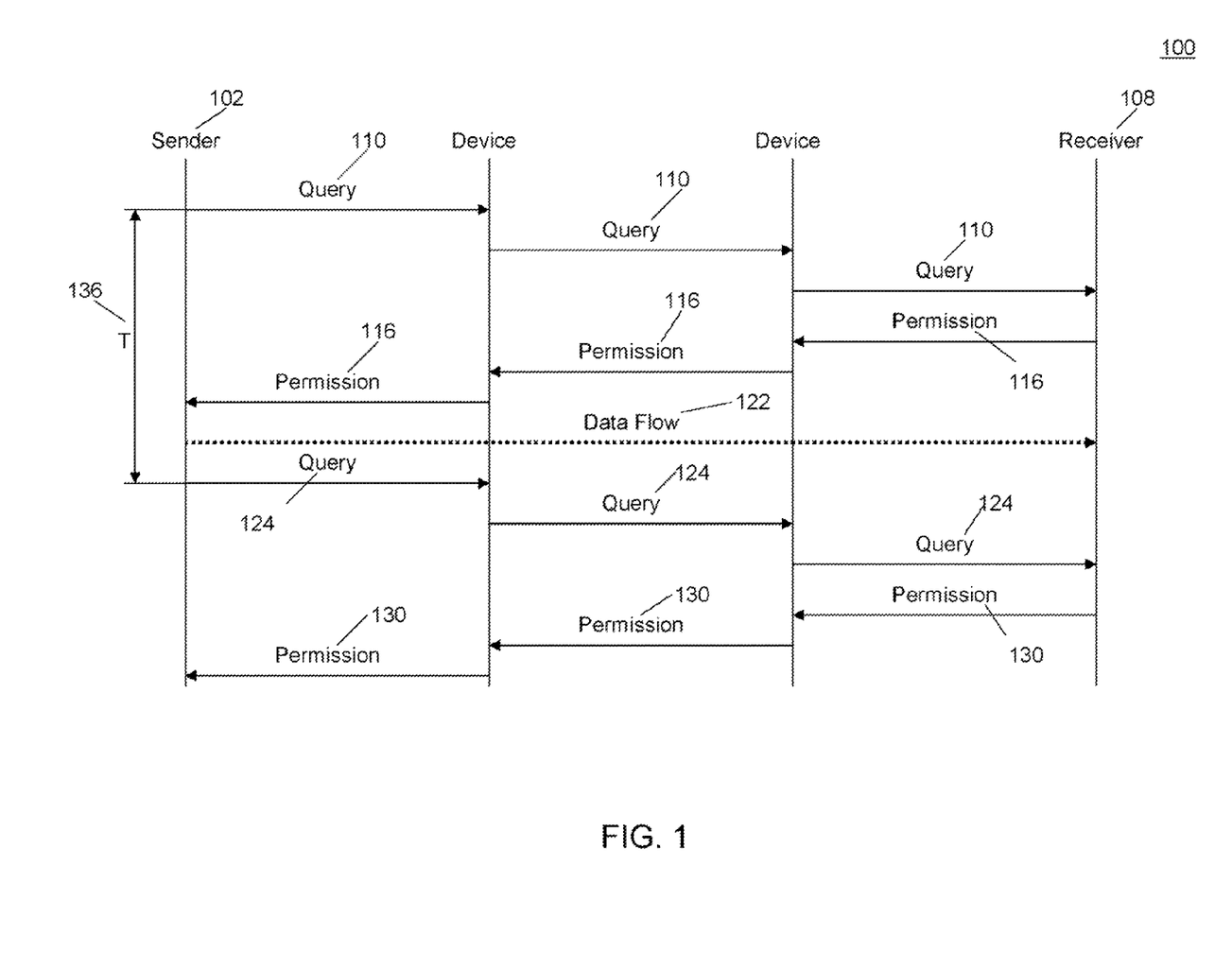
FIG. 1 is a diagram illustrating query and permission messages sent in connection with a data flow between a sender and a receiver in accordance with some embodiments.

Turning to FIG. 1, an example 100 of how permissions can be set up between a sender 102 and a receiver 108 in accordance with some embodiments is illustrated. As shown, a sender 102 sends a receiver 108 a query message 110 to request permission to send a data flow 122. The requested application is described in a flow identifier of the query message. The query message installs the reverse routing state in GIST for the path of a permission message 116. Receiver 108 then sends sender 102 permission message 116 to allow incoming data packets in a data flow 122 along the path of query message 110. After the permission state is set up between the sender and the receiver, the sender can then send the allowed volume (permission) of data to the receiver during the time interval specified.

Sender 102 can send a query message 110 and 124 every refresh period (T) 136 in some embodiments. Receiver 108 can then send sender 102 a permission message 116 or 118 after receiving a query message 110 or 124.

In some embodiments, asymmetric transmission of query and permission messages can be supported. After a permission state is set up, if the receiver wants to change the permission state or security algorithm, it can send another permission message without receiving another query message.

A public key encryption algorithm can be used in some embodiments to protect fields (described below) in the signaling messages. This encryption can be used to support the authentication and integrity of the messages. To bind a public key and the sender, an X.509 certificate (which is described in RFC5280 (which is hereby incorporated by reference herein in its entirety)) can be used, and the certificate can be carried in the signaling messages in some embodiments. Alternatively, Cryptographically Generated Addresses (CGA) (which is described in RFC3972 (which is hereby incorporated by reference herein in its entirety)) can be used with Internet Protocol version 6 (IPv6) to bind an IPv6 address and a public key, instead of a public key certificate, in some embodiments.

In some embodiments, a proof-of-work mechanism can be used to rate-limit query messages that might be maliciously used to mount a denial-of-service attack. For example, a proof-of-work mechanism may require a sender to perform some time- or processing-power-intensive task (such as repeated performance of a hash function) that is then verified by a receiver before a query message will be accepted.

Figure 2:
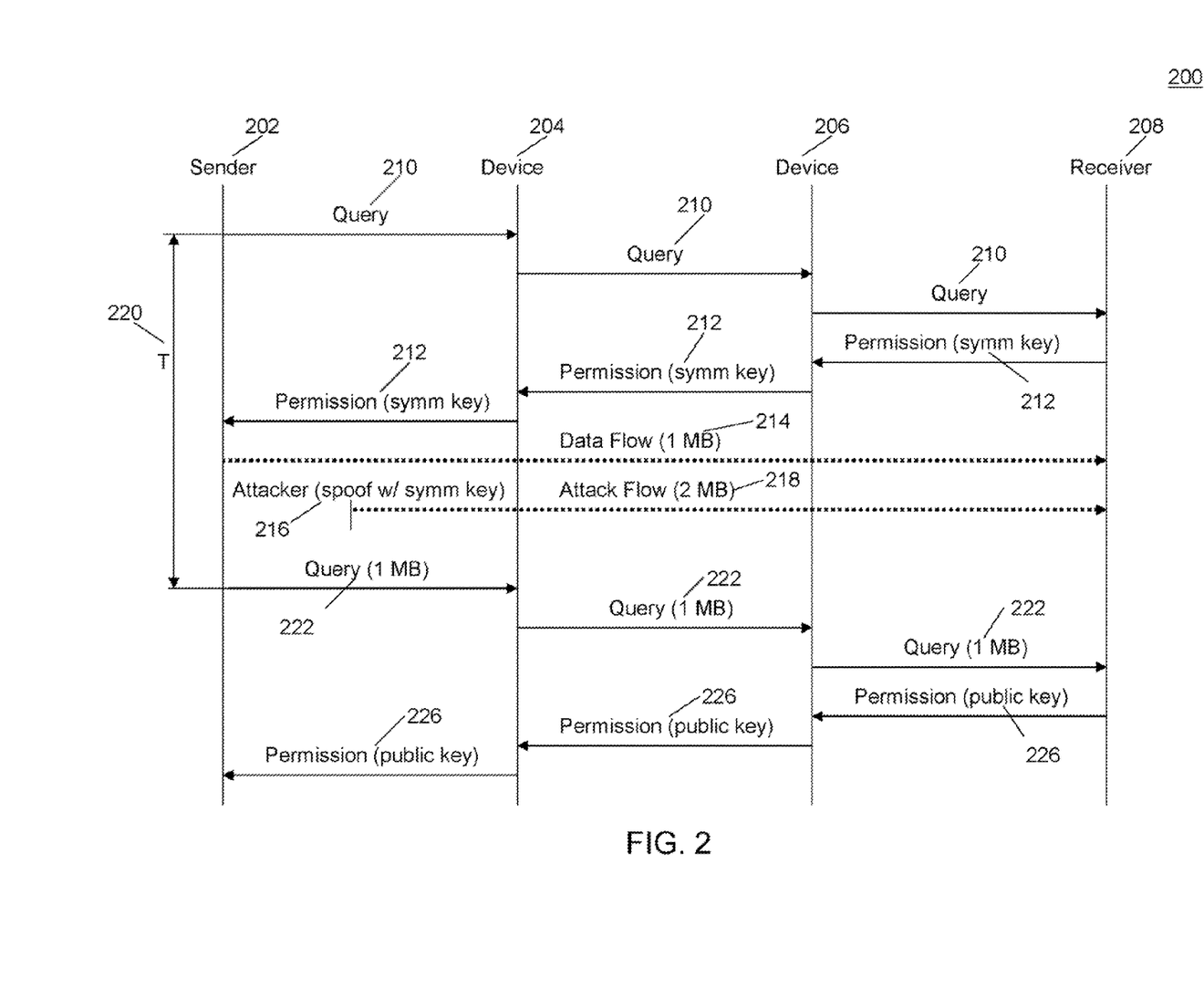
FIG. 2 is a diagram illustrating detecting of a spoofing attack in accordance with some embodiments.

FIG. 2 shows an example of detecting an attack in accordance with some embodiments. As illustrated, two signaling messages (query message 210 and permission message 212) set up a permission state for a data flow 214 between a sender 202 and a receiver 208. In this example, assume that receiver 208 grants a 10 MB size permission to sender 202 and asks the sender to use symmetric key cryptography to encrypt the authentication field of IPsec. After setting up the permission state, sender 202 sends data packets whose total volume is 1 MB. Next, an attacker 216, which spoofs the address of sender 202 and has the shared key, sends additional attack packets 218 whose total volume is 2 MB. After a refresh period (T) 220, sender 202 sends a query message 222 that contains an indication of the volume of data (in this example, 1 MB) that it has sent. Because query message 222 is protected by public key cryptography, others cannot generate and/or modify the query message. Receiver 208 can then detect the attack by comparing the indication of the volume in the query message (in this example, 1 MB) and total volume of data (in this example, 3 MB) that the receiver has received. After receiver 208 detects the attack, it sends a permission message 226 with an indication to change the cryptography algorithm of IPsec AH to public key cryptography, such as RSA and ECC, to defeat the attacker's knowledge of the symmetric key. After sender 202 receives permission message 226, the sender changes the cryptography algorithm for the IPsec AH of data packets. Subsequent attack packets using the outdated symmetric key will then be dropped at one of devices 204 or 206 because of the new IPsec AH verification process.

Figure 3:
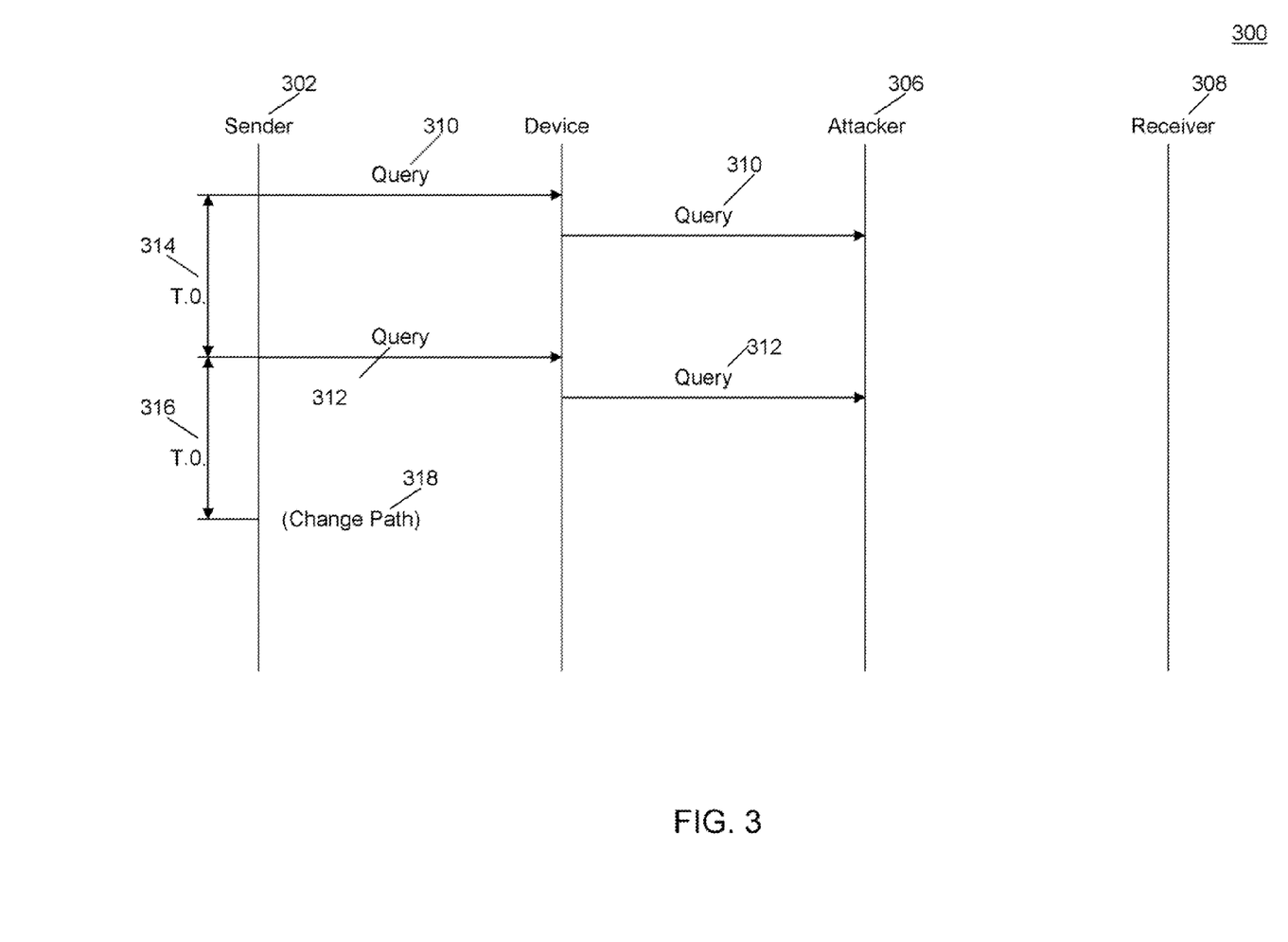
FIG. 3 is a diagram illustrating drop attack that can be detected in accordance with some embodiments.

In some embodiments, drop attacks (or black-hole attacks) can be detected. In an example of such an attack, a compromised router between a sender and a receiver drops all packets and/or messages or drops selected packets. FIG. 3 illustrates an example 300 of detecting a drop attack. As shown, an attacker 306 drops all packets and signaling messages being transmitted from a sender 302 to a receiver 308. Because sender 302 does not receive a permission message after sending two query messages 310 and 312 and waiting for timeouts 314 and 316 to expire, it suspects that the packets might have been dropped. Therefore, it changes the path of the messages and data flow at point 318.

Figure 4:
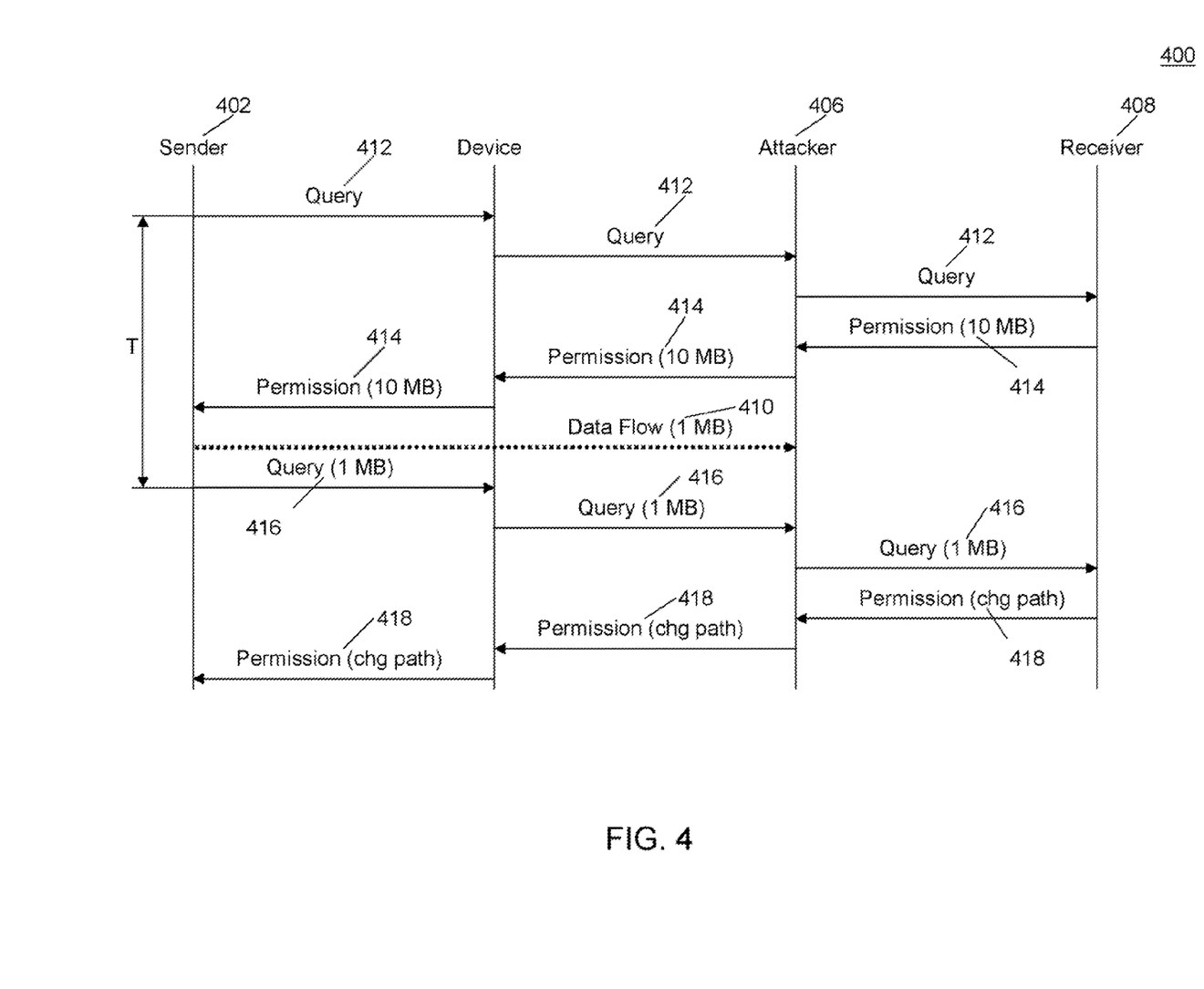
FIG. 4 is a diagram illustrating detecting of a drop attack in accordance with some embodiments.

In FIG. 4, another example 400 of detecting a drop attack is shown. As illustrated, an attacker 406 drops data packets 410 but forwards signaling messages 412, 414, 416, and 418. A query message 416 indicates the volume of data (in this example, 1 MB) that sender 402 has sent to receiver 408. Since receiver 408 has not received the data flow 410, the receiver can detect the packet drop attack. Receiver 408 then sends a permission message 418 indicating a request to change the path of the data flow and signaling messages to avoid attacker 406. After receiving the permission message, sender 402 changes the path.

Signaling messages (such as query messages and permission messages), in some embodiments, can include a common header and one or more type-length-value (TVA) objects. The common header can indicate the message type of the message. For example, the header can indicate whether the message is a query message or a permission message. As described above, query messages can be used to request permission and monitor traffic flow. A query message can include a common header, a flow identification, a message sequence number, a requested volume, a sent volume, a public key certificate, and authentication data. As also described above, a permission message can be used to set up, remove, and modify a permission state for a flow. A permission message can include a common header, a flow identification, a message sequence number, an allowed volume, a time-to-live (TTL), a refresh time, a public key certificate, a defense, and authentication data.

In some embodiments, objects begin with the common object header. The header can indicate an object's type and the length of the object. Some examples of the object type are flow identification, message sequence number, and allowed volume. The header can also indicate how to treat the objects when they are unknown. For example, the indication can be "Mandatory" (e.g., if the object is not understood, the entire message containing it must be rejected, and an error message sent back), "Ignore" (e.g., if the object is not understood, it must be deleted and the rest of the message processed as usual), "Forward" (e.g., if the object is not understood, it must be retained unchanged in any message forwarded as a result of message processing, but not stored locally), etc.

The flow identification can indicate an IP address version (e.g., version 4, 6, etc.), a protocol identifier, the port number of the sender, the port number of the intended receiver, the IP address of the sender, and the IP address of the intended receiver.

The message sequence number can include an incrementing sequence number. This can be used to prevent a replay attack.

The requested volume can indicate the number of bytes that a sender requests for a data flow.

The sent volume can indicate the number of bytes that a sender has sent since the sender received the permission.

The allowed volume can indicate the number of bytes that a receiver allows for a flow.

The time-to-live (TTL) can indicate the time limit for the permission state of a flow. This TTL can be expressed in units of time (e.g., milliseconds, etc.) in some embodiments.

The refresh time can indicate the period of time during which the permission remains valid.

The public key certificate can include an X.509 certificate (or any other suitable certificate) of a node's public key.

The defense indicator can indicate a solution against an attack. For example, the defense indicator can indicate that no action is to be taken, that symmetric key cryptography is to be used to encrypt the authentication field of IPsec, that public key cryptography is to be used to encrypt the authentication field of IPsec, that the path is to be changed to avoid a compromised router, etc. The defense indicator can also indicate an IPsec authentication algorithm—e.g., the cryptography algorithm for the IPsec authentication field. For example, this can be HMAC-SHA1, HMAC-SHA-256, HMAC-MD5, RSA-1024, RSA-2048, ECC-160, ECC-224, Digital Signature Algorithm (DSA)-1024, DSA-2048, or the algorithm from an X.509 certificate. The defense indicator can further include the key for the IPsec authentication field.

The authentication data can indicate the encrypted data of message fields for authentication and integrity. A public key encryption technique can be used for encrypting the message field data.

Figure 5:
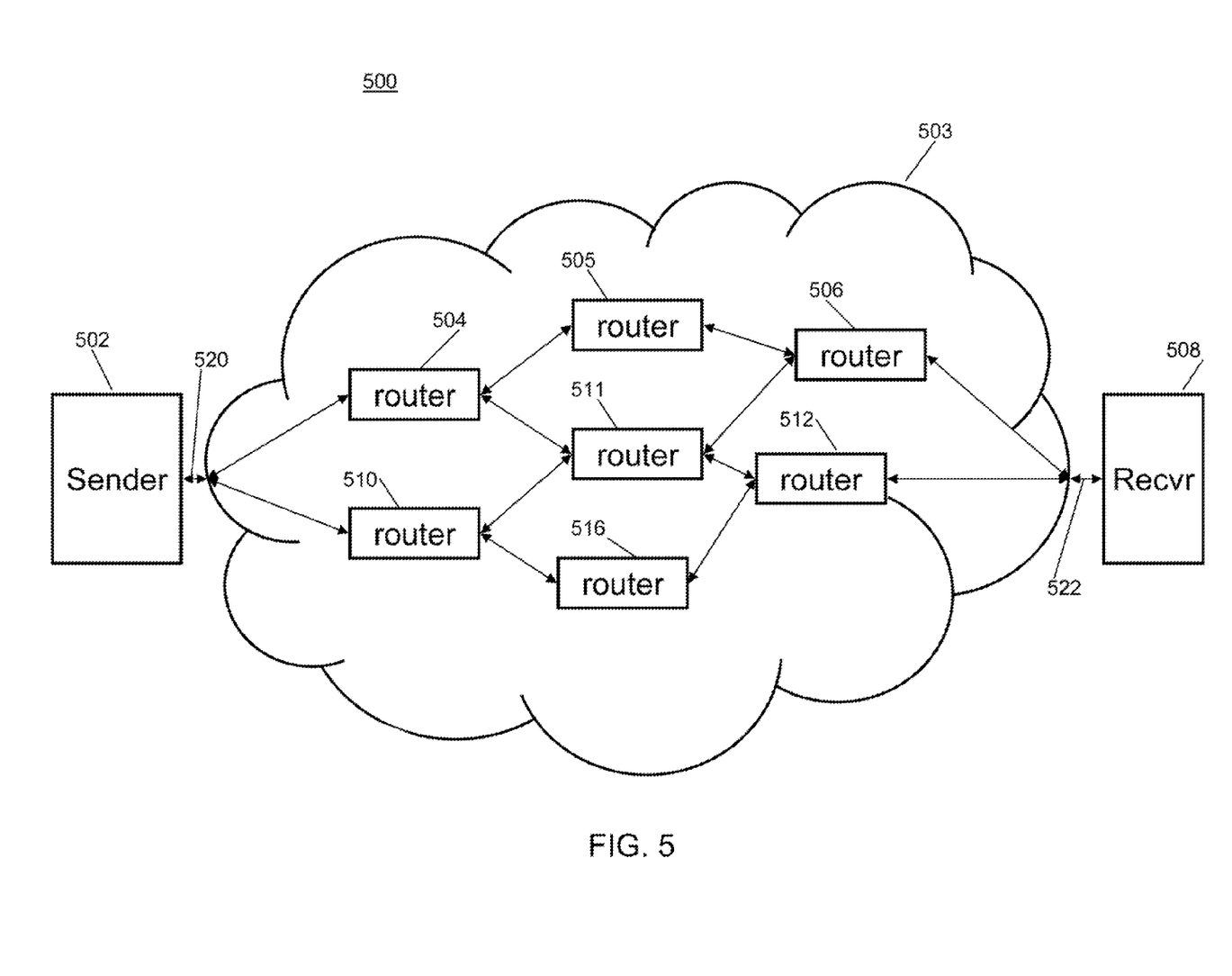
FIG. 5 is a diagram illustrating hardware that can be used in accordance with some embodiments.

Turning to FIG. 5, an example 500 of hardware for implementing methods and systems for controlling traffic on a communication network is illustrated. As shown, this hardware can include a sender 502, a receiver 508, a communication network 503, routers 504, 505, 506, 510, 511, 512, and 516, and connections 520 and 522. Sender 502 can be any suitable device that sends data to receiver 508. For example, sender 502 can be a general purpose device such as a computer or a special purpose device such as a client, a server, a Voice over Internet Protocol (VoIP) telephone, a multimedia device, etc. Receiver 508 can be any suitable device that receives data from sender 502. For example, receiver 508 can be a general purpose device such as a computer or a special purpose device such as a client, a server, a Voice over Internet Protocol (VoIP) gateway or multi-conferencing unit, a multimedia server, etc. Any of these general or special purpose devices can include any suitable components such as a processor (which can be a microprocessor, digital signal processor, a controller, etc.), memory, communication interfaces, display controllers, input devices, etc. Communication network 503 can be any suitable communication network, such as the Internet, a local area network (LAN), a wide area network (WAN), a wired network, a wireless network, a telephone network, a cable television network, a satellite network, etc. Routers 504, 505, 506, 510, 511, 512, and 516 can be any suitable devices that can pass data being transmitted between sender 502 and receiver 508. For example, any one or more of routers 504, 505, 506, 510, 511, 512, and 516 can be a router, a gateway, a switch, a firewall, or any other suitable device. Connections 520 and 522 can be any suitable connections for connecting sender 502 and receiver 508 to communications network 503. For example, connections 520 and 522 can be wired or wireless connections.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for controlling traffic on a communication network, comprising:
    receiving, at a hardware processor in a receiver, a query message for permission to send a data flow to the receiver;
    sending, using the hardware processor, a permission message from the receiver;
    receiving, at the hardware processor, a signaling message that indicates a volume of data that has been sent to the receiver;
    determining, using the hardware processor, that at least one data packet is unauthorized if a volume of data that has been received by the receiver is greater than the volume of data that has been sent to the receiver as indicated in the signaling message; and
    in response to determining that the at least one data packet is unauthorized, causing the path for sending the data flow to be changed using the hardware processor.

2. The method of claim 1, wherein the path is changed to use a relay node.

3. The method of claim 1, wherein the path is changed using multi-homing.

4. A method for controlling traffic on a communication network, comprising:
    passing, using a hardware processor, a query message for permission to send a data flow to a receiver;
    passing, using the hardware processor, a permission message that authorizes the sender to send a given volume of data;
    receiving, at the hardware processor, a signaling message that indicates a volume of data that has been sent to the receiver; and
    determining, using the hardware processor, that at least one data packet is unauthorized if a volume of data that has been received by the receiver is greater than the volume of data that has been sent to the receiver as indicated in the signaling message.

5. The method of claim 4, further comprising dropping the at least one data packet that is determined to be unauthorized using the hardware processor.

6. A method for controlling traffic on a communication network, comprising:
    passing, using a hardware processor, a query message for permission to send a data flow to a receiver;
    passing, using the hardware processor, a signaling message that indicates a volume of data that has been sent to the receiver;
    determining, using the hardware processor, that at least one data packet is unauthorized if a volume of data that has been received by the receiver is greater than the volume of data that has been sent to the receiver as indicated in the signaling message;
    in response to determining that the at least one data packet is unauthorized, passing, using the hardware processor, a permission message that indicates a security protocol to be used when transmitting packets to the receiver; and
    determining, using the hardware processor, that a further data packet being sent to the receiver violates the security protocol.

7. The method of claim 6, further comprising blocking the data packet from being received at the receiver using the hardware processor.

8. The method of claim 6, wherein the security protocol is IPSec AH.

9. The method of claim 6, further comprising passing, using the hardware processor, a message indicating that an encryption technique used in the security protocol is changed.

10. The method of claim 9, wherein the encryption technique is changed from symmetric key encryption to public key encryption.

11. A method for controlling traffic on a communication network, comprising:
    receiving, at a hardware processor in a receiver, a query message for permission to send a data flow to the receiver;
    receiving, at the hardware processor, a signaling message that indicates a volume of data that has been sent to the receiver;
    determining, using the hardware processor, that at least one data packet is unauthorized if a volume of data that has been received by the receiver is greater than the volume of data that has been sent to the receiver as indicated in the signaling message;
    in response to determining that the at least one data packet is unauthorized, sending, using the hardware processor, a permission message that indicates a security protocol to be used when transmitting packets to the receiver; and
    detecting, using the hardware processor, that a further data packet being sent to the receiver violates the security protocol.

12. The method of claim 11, further comprising ignoring the data packet at the receiver using the hardware processor.

13. The method of claim 11, wherein the security protocol is IPSec AH.

14. The method of claim 11, further comprising sending, using the hardware processor, a message indicating that an encryption technique used in the security protocol is changed.

15. The method of claim 14, wherein the encryption technique is changed from symmetric key encryption to public key encryption.

16. A system for controlling traffic on a communication network, comprising:
a receiver having a hardware processor that:
receives a query message for permission to send a data flow to the receiver;
sends a permission message from the receiver;
receives a signaling message that indicates a volume of data that has been sent to the receiver;
determines that at least one data packet is unauthorized if a volume of data that has been received by the receiver is greater than the volume of data that has been sent to the receiver as indicated in the signaling message; and
causes the path for sending the data flow to be changed in response to determining that the at least one data packet is unauthorized.

17. The system of claim 16, wherein the path is changed using a relay node.

18. The system of claim 16, wherein the path is changed using multi-homing.

19. A system for controlling traffic on a communication network, comprising:
a hardware processor that:
passes a query message for permission to send a data flow to a receiver;
passes a permission message that authorizes the sender to send a given volume of data;
receives a signaling message that indicates a volume of data that has been sent to the receiver; and
determines that at least one data packet is unauthorized if a volume of data that has been received by the receiver is greater than the volume of data that has been sent to the receiver as indicated in the signaling message.

20. The system of claim 19, wherein the hardware processor drops the at least one data packet that is determined to be unauthorized.

21. A system for controlling traffic on a communication network, comprising:
a hardware processor that:
passes a query message for permission to send a data flow to a receiver;
passes a signaling message that indicates a volume of data that has been sent to the receiver;
determines that at least one data packet is unauthorized if a volume of data that has been received by the receiver is greater than the volume of data that has been sent to the receiver as indicated in the signaling message;
in response to determining that the at least one data packet is unauthorized, passes a permission message that indicates a security protocol to be used when transmitting packets to the receiver; and
detects that a further data packet being sent to the receiver violates the security protocol.

22. The system of claim 21, wherein the hardware processor also blocks the data packet from being received at the receiver.

23. The system of claim 21, wherein the security protocol is IPSec AH.

24. The system of claim 21, wherein the hardware processor also causes an encryption technique used in the security protocol to be changed.

25. The system of claim 24, wherein the encryption technique is changed from symmetric key encryption to public key encryption.

26. A system for controlling traffic on a communication network, comprising:
a receiver having a hardware processor that:
receives a query message for permission to send a data flow to the receiver;
receives a signaling message that indicates a volume of data that has been sent to the receiver;
determines that at least one data packet is unauthorized if a volume of data that has been received by the receiver is greater than the volume of data that has been sent to the receiver as indicated in the signaling message;
in response to determining that the at least one data packet is unauthorized, sends a permission message that indicates a security protocol to be used when transmitting packets to the receiver; and
detects that a further data packet being sent to the receiver violates the security protocol.

27. The system of claim 26, wherein the receiver also ignores the data packet at the receiver.

28. The system of claim 26, wherein the security protocol is IPSec AH.

29. The system of claim 26, wherein the hardware processor also causes an encryption technique used in the security protocol to be changed.

30. The system of claim 29, wherein the encryption technique is changed from symmetric key encryption to public key encryption.

* * * * *